US010119743B2

(12) United States Patent
Amsinger et al.

(10) Patent No.: US 10,119,743 B2
(45) Date of Patent: Nov. 6, 2018

(54) PRODUCT COOLING APPARATUSES

(71) Applicant: NESTEC SA, Vevey (CH)

(72) Inventors: Daniel Amsinger, Eureka, MO (US); John Schaaf, Edwardsville, IL (US); William Cahoon, Webster Groves, MO (US); Sam Orr, St. Louis, MO (US); Enes Okic, St. Louis, MO (US)

(73) Assignee: NESTEC SA, Vevey (CH)

( * ) Notice: Subject to any disclaimer, the term of this patent is extended or adjusted under 35 U.S.C. 154(b) by 648 days.

(21) Appl. No.: 14/802,339

(22) Filed: Jul. 17, 2015

(65) Prior Publication Data

US 2016/0018150 A1 Jan. 21, 2016

Related U.S. Application Data

(60) Provisional application No. 62/026,409, filed on Jul. 18, 2014.

(51) Int. Cl.
| | |
|---|---|
| *A23K 40/20* | (2016.01) |
| *F25D 13/06* | (2006.01) |
| *F25D 17/08* | (2006.01) |
| *F25D 25/04* | (2006.01) |
| *A23K 40/25* | (2016.01) |
| *A23K 50/42* | (2016.01) |
| *B29C 47/00* | (2006.01) |
| *B29C 47/88* | (2006.01) |

(52) U.S. Cl.
CPC ............ *F25D 13/067* (2013.01); *A23K 40/20* (2016.05); *A23K 40/25* (2016.05); *A23K 50/42* (2016.05); *B29C 47/0011* (2013.01); *B29C 47/0016* (2013.01); *F25D 17/08* (2013.01); *F25D 25/04* (2013.01); *B29C 47/884* (2013.01)

(58) Field of Classification Search
CPC ...... F27D 15/0286; F26B 17/14; F26B 17/12; F26B 9/063
USPC ........... 198/547, 550.13, 550.1; 34/165, 168, 34/169, 170; 432/77
See application file for complete search history.

(56) References Cited

U.S. PATENT DOCUMENTS

| | | | | |
|---|---|---|---|---|
| 1,496,094 | A | * 6/1924 | Moetteli | ................. C10B 39/02 202/228 |
| 3,289,568 | A | 12/1966 | Ronning | |
| 3,365,813 | A | * 1/1968 | Collins | ............... F26B 17/1416 34/170 |
| 4,371,425 | A | * 2/1983 | Danguillier | ............. C10B 39/02 202/228 |
| 4,512,793 | A | 4/1985 | Harrison | |
| 4,887,364 | A | 12/1989 | Geelen | |
| 5,375,342 | A | 12/1994 | Giesler | |
| 5,906,482 | A | 5/1999 | Tedman | |
| 6,199,294 | B1 | * 3/2001 | Becker | .................... F26B 9/063 34/168 |

(Continued)

OTHER PUBLICATIONS

International Search Report and Written Opinion PCT/IB2015/055446; dated Dec. 17, 2015.

*Primary Examiner* — William R Harp

(57) ABSTRACT

Coolers for cooling pet food products and methods regarding same are presented. In an embodiment, the present invention provides a cooler comprising a chamber having product inlet, a product outlet and an air outlet, and at least one air duct having an exit opening so constructed and arranged for providing airflow into the product outlet.

17 Claims, 3 Drawing Sheets

(56) References Cited

U.S. PATENT DOCUMENTS 8,763,273 B2 * 7/2014 Moretto .............. F26B 17/1441
  34/168
2003/0200672 A1 10/2003 Keller

* cited by examiner

PRODUCT COOLING APPARATUSES

BACKGROUND

The present invention relates generally to pet food technologies. More specifically, the present invention relates product cooling apparatuses and methods of using same.

There are a number of conventional coolers for cooling extruded pet food products. For example, a typical cooler has a cooling compartment that receives bulk pet food to be cooled. There are usually a number of pivotable bars or slats below an outlet at the bottom of the compartment for collecting the pet food. The mechanical bars or slats are designed to allow the passage of cooling air through and around the pet food accumulated on the slats. The slats can be rotated in one position to form a floor collecting the pet food for cooling and another position to allow the passage of the pet food into a collection hopper. The cooling capability of this type of cooler is limited relative to it's total volume due to the fact that by the nature of it's design, an empty collection hopper must be provided below the slats in order to collect cooled product, and this space provides no cooling function. Further, the slats tend to collect a residual of fine product material that remains even when the slats are rotated, which can lead to contamination problems. The mechanical slats also require a substantial effort and safety precautions to clean between production runs and as the moving parts are pneumatically or hydraulically driven through linkages, maintenance can be costly.

Another cooler design set forth in U.S. Pat. No. 5,906,482 for cooling extruded feed products includes a cooling chamber with an outer wall surrounding the inner chamber. This forms a cooling air circulating chamber right outside the inner cooling chamber. Apertures are formed in a wall between the air circulating chamber and the cooling chamber thereby allowing cooling air to flow into the cooling chamber through the apertures. Air flow exits near the top as pet food product is dropped from a product inlet in the top of the cooling chamber. The product exits at the bottom of the cooling chamber. Nevertheless, there are a number of problems that arise from this design. First, small pet food products such as pellets and fines or coating materials (e.g. fats) thereof may plug the apertures thereby reducing the efficiency of the cooling process. Sanitation issues also arise with particulates from the pet food falling through the apertures and remaining in the exterior air circulating chamber. Further, since the cooling air apertures extend up the side wall of the cooling chamber, not all cooling air contacts all material in the cooling chamber, limiting cooling efficiency.

Therefore, there is a need to provide improved coolers that allow for flexibility in design for alternate capacities and rates for cooling pet food products.

SUMMARY

The present invention relates generally to pet food technologies. More specifically, the present invention relates to coolers designed for cooling pet food and methods of using same.

In an embodiment, the present invention provides a cooler comprising a chamber having product inlet, a product outlet and an air outlet. The cooler comprises at least one air duct having an exit opening so constructed and arranged for providing airflow into the product outlet.

In an embodiment, air from the air duct provides the only airflow into the product outlet.

In an embodiment, the cooler comprises at least one panel addition attached to the air duct for directing airflow from the exit opening of the air duct to the product outlet of the chamber.

In an embodiment, the cooler comprises a conveyer positioned below the product outlet.

In an embodiment, the cooler comprises at least one panel addition, wherein the panel addition is attached to the air duct and the conveyor, and wherein the panel addition and the conveyer form an air plenum for directing airflow from the air duct to the product outlet of the chamber.

In an embodiment, the air plenum is isolated from the external atmosphere.

In an embodiment, the conveyer is a type selected from, the group consisting screw, drag, electromechanical vibrating and combinations thereof.

In an embodiment, the air duct is attached to the chamber.

In an embodiment, air flows in a direction from the exit opening of the air duct through the product outlet to the air outlet of the chamber.

In another embodiment, the present invention provides a cooler comprising a chamber having a ceiling and a plurality of walls. Lower portions of the walls of the chamber form a product outlet. There is also a product inlet in the chamber and air outlet in the chamber. The cooler also comprises one or more air ducts having an exit opening are so constructed and arranged for providing airflow into the product outlet.

In an embodiment, the lower portions of the walls of the chamber form a product outlet in the shape of a rectangle having a length and a width, the length being greater than the width.

In an embodiment, the air duct is so constructed and arranged for providing airflow along the entire length and width of the product outlet into the product outlet.

In an embodiment, at least one of the lower portions of the walls angles inwardly to the product outlet.

In an alternative embodiment, the present invention provides a pet food product cooler comprising a chamber comprising a product inlet, a product outlet and an air inlet; at least one air duct having an exit opening so constructed and arranged for providing airflow into the product outlet; and a conveyor positioned below the product outlet. The air duct and the conveyor form an air plenum for directing airflow from the air duct to the product outlet of the chamber.

In another embodiment, the present invention provides a method for manufacturing a pet food product. For example, the method comprises transferring the pet food product to a cooling chamber having a product inlet, a product outlet, an air outlet and a conveyor positioned below the product outlet. The pet food product is deposited in the chamber through the product inlet and accumulates in the chamber and on the conveyor through the product outlet. Airflow is provided to the product outlet of the cooling chamber while the pet food product is settling on the conveyor. The airflow travels through the pet food product exiting the product outlet and through the pet food product accumulated in the chamber. The pet food product that has settled on the conveyor is removed after the product has been sufficiently cooled.

An advantage of the present invention is to provide a cooler that is capable of cooling pet food at a high rate while maintaining the desired retention time within the cooler.

Another advantage of the present invention is to provide a pet food cooler apparatus that requires less maintenance than conventional coolers.

Yet Another advantage of the present invention is to provide a pet food cooler apparatus that requires less cleaning effort between production runs.

Still another advantage of the present invention is to provide a cooler that is simple to operate does not require mechanical or hydraulic slats for operation.

Another advantage of the present invention is to provide a cooler that is capable of handling coated pet food and particulates thereof without contamination issues.

Yet another advantage of the present invention is to provide a cooler that is capable of cooling coated pet food and particulates thereof without having a reduced efficiency in the cooling rate.

Additional features and advantages are described herein, and will be apparent from, the following Detailed Description and the figures.

DETAILED DESCRIPTION

The present invention relates generally to pet food technologies. More specifically, the present invention relates to engineered coolers or cooler apparatuses that cool pet food products and methods of using same. The pet food products can be, for example, any suitable pet food product that require cooling or temperature adjustment such as extruded pet foods, coated pet foods, pellets, tables, etc.

Figure 1:
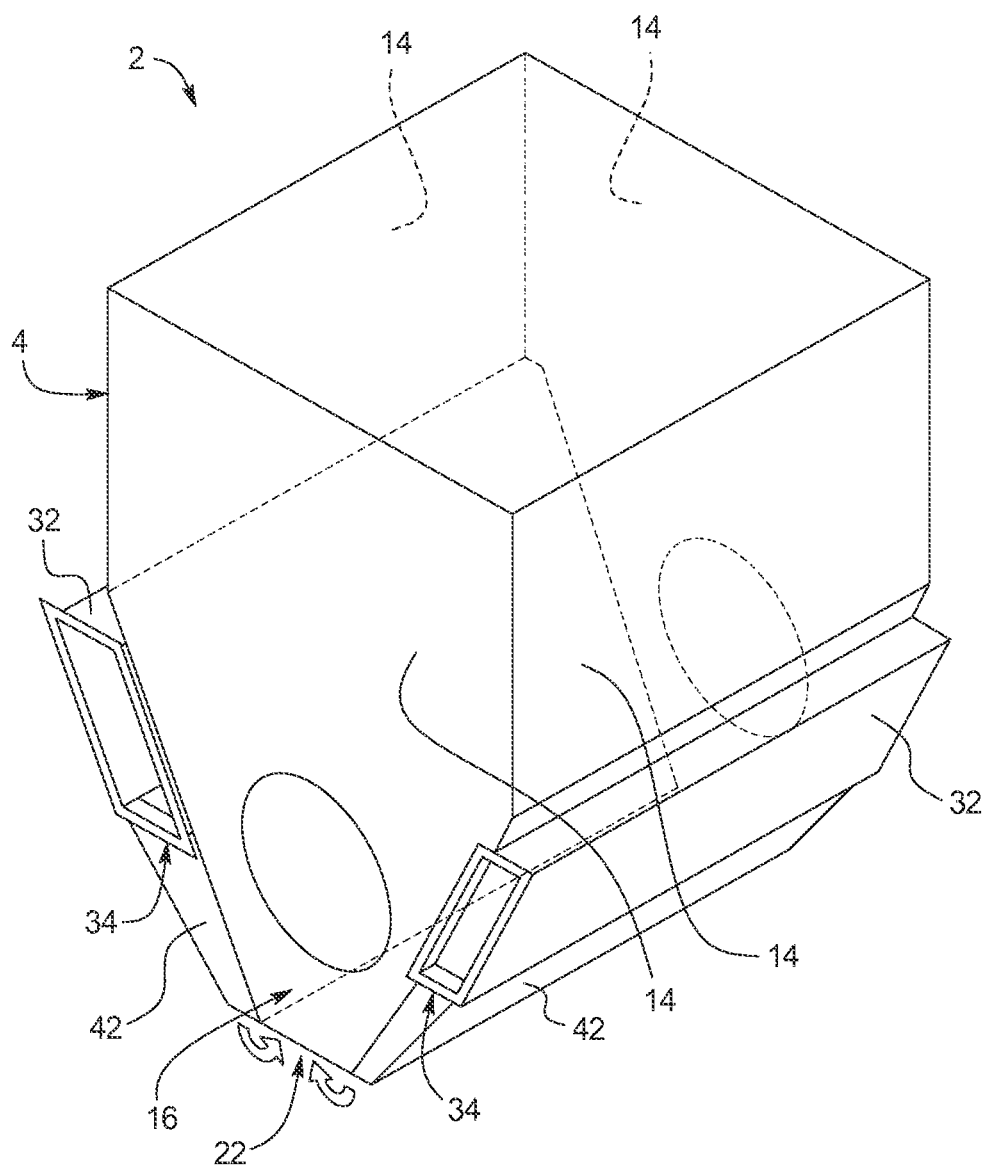
FIG. 1 is a perspective view of the cooler in one embodiment of the present invention.

In an embodiment illustrated in FIG. 1, the cooler 2 comprises a hopper, container or chamber 4 having product inlet, a product outlet and an air outlet. The cooler also comprises one or more air ducts having an exit opening so constructed and arranged for providing airflow into the product outlet.

Figure 2:
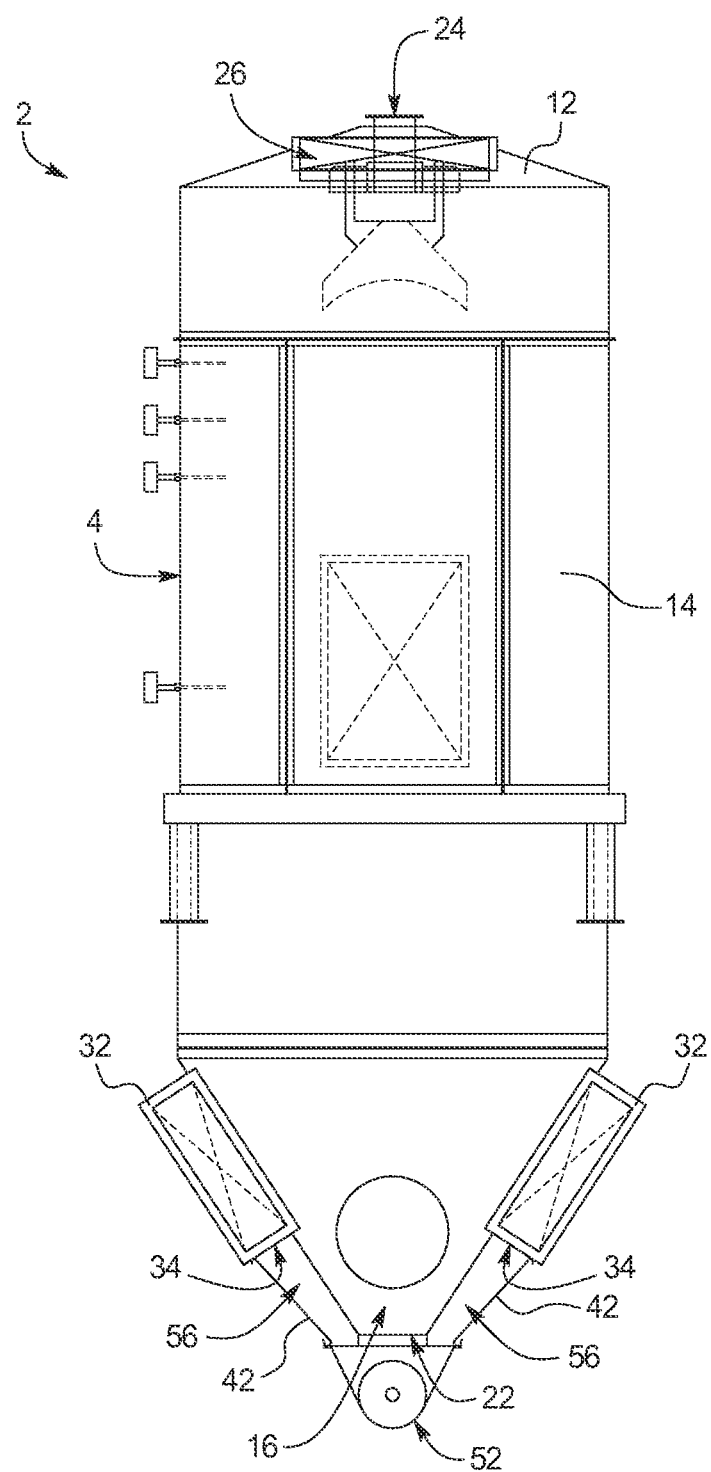
FIG. 2 is a side view of the cooler in another embodiment of the present invention.

In an embodiment illustrated in FIGS. 1-2, the cooler 2 comprises a chamber 4 having a plurality of walls 14. Lower portions 16 of the walls 14 form a product outlet 22. A product inlet 24 in the chamber 4 and an air outlet 26 are also in the chamber 4. It should be appreciated that the product inlet 24 and the air outlet 26 can be located at any suitable position in the chamber 4. For example, in the embodiment illustrated in FIG. 2, the air outlet 26 is located in a ceiling 12 of the chamber 4, and the product inlet 24 is also located in the ceiling 12, such that pet food product enters and cooling air exits at the top of the cooler 2.

Any suitable fan, blower or exhaust system can be positioned at the air outlet 26 of the chamber 4. The exhaust system, for example, induces a negative pressure in the chamber 4, which draws air out of the chamber.

In another embodiment, at least one lower portions 16 of the walls 14 angles inwardly or tapers to the product outlet 22. For example, as illustrated in FIGS. 1-2, two opposing lower portions 16 taper to form a narrower product outlet 22. This cooler design provides greater flexibility and control over the volume of pet food product that enters the chamber 4 and passes through the product outlet 22.

The cooler 2 further comprises one or more air ducts 32 having an exit opening 34 so constructed and arranged for providing airflow into the product outlet 22. The direction of the airflow through the air ducts 32 is represented in FIG. 1, for example, by the large arrows. For example, the exit opening 34 can be located on the bottom side of the air ducts 32 and directed toward the product outlet 22 of the chamber 4. Preferably, the air ducts 32 are so constructed and arranged for providing airflow into the product outlet 22 along the entire length of the product outlet 22. In an embodiment, two or more air ducts can be part of a single air duct that splits and surrounds the chamber 4. The air ducts can be connected to one or more sources that are capable of providing any suitable type of air depending on the desired specifications for the final pet food products. For example, air can have any suitable moisture level or temperature. The air can be ambient air or cooled air.

In an embodiment illustrated in FIG. 1, the product outlet 22 is in the shape of a rectangle having a length and a width, the length being greater than the width. Moreover, in this design, the air duct 32 can be so constructed and arranged for providing airflow along the entire length and width of the product outlet 22 and into the product outlet 22. This provides an elongated product discharge area from the chamber 4 and allows a greater volume of pet food to be cooled as it passes through the product outlet 22. In an embodiment, the air ducts 32 can be attached to the walls 14 at any suitable location along the chamber 4.

In another embodiment, the cooler 2 further comprises one or more panel additions 42 attached to the air duct 32 for directing airflow from the exit opening 34 of the air duct 32 to the product outlet 22 of the chamber 4. For example, in the embodiments illustrated in FIGS. 1-3, the exit openings 34 of the air ducts 32 is located on the bottom, and the panel additions 42 enclose the exit openings 34 to direct the airflow along the entire length of the product outlet 22. It should be appreciated that the air ducts 32 and panel additions 42 can comprise a single unit (e.g. air ducts 32 extending all the way to the product outlet 22) for achieving the same objective, for example, of providing air solely to the product outlet 22 of the chamber 4.

In another embodiment illustrated in FIGS. 2-3, the cooler 2 further comprises a conveyer 52 positioned below the product outlet 22. Typically, the conveyor 52 is covered as it extends out from under the chamber 4 to prevent contamination of the food and to maintain the pet food at a specified moisture and temperature level. The conveyor 52 takes the cooled pet food product 72 from the cooling chamber 4 to a desired location such as a storage or bagging room for further processing. The conveyer 52 can be any suitable type of conveyor for removing pet food from the cooler 2 after the pet food has been cooled. For example, the conveyer 52 can be any suitable type of conveyor such as a screw, drag or electromechanical vibrating conveyor.

Extruded or heated pet food products 72 are placed in the cooling chamber 4 via the product inlet 24 and accumulate in the bottom of the chamber 4 as they settle and flow into the conveyer 52. During this time airflow is directed through the product outlet 22. The accumulation of pet food product 72 within the cooling chamber 4 can be monitored and controlled by intermittent or variable speed operation of the product feed and/or the conveyer 52. The flow rate of the pet food product 72 is controlled accordingly to allow them to remain in the cooling chamber 4 long enough to achieve the desired cooling.

The conveyer 52 not only collects the pet food product 72 falling through the product outlet 22 but also assists in directing the airflow from the air ducts 32 into the product outlet 22. For example, the cooler 2 can comprise one or more panel additions 42 that are attached to the air duct 32 and the conveyor 52. The panel addition 42 and the conveyor 52 form an enclosure or air plenum 56 for directing airflow from the air duct 32 to the product outlet 22 of the chamber 4. Similarly, the air duct 32 and the conveyor 52 can form the air plenum 56 for directing airflow from the air duct 32 to the product outlet 22 of the chamber 4. In this manner, the air plenum 56 can be isolated from the external atmosphere thereby allowing only air entering from the air ducts 32 to reach the product outlet 22 of the chamber 4. For example, this provides control over the temperature and humidity of the cooling air, which will vary according to the desired final temperature and moisture levels of the pet food products.

Figure 3:
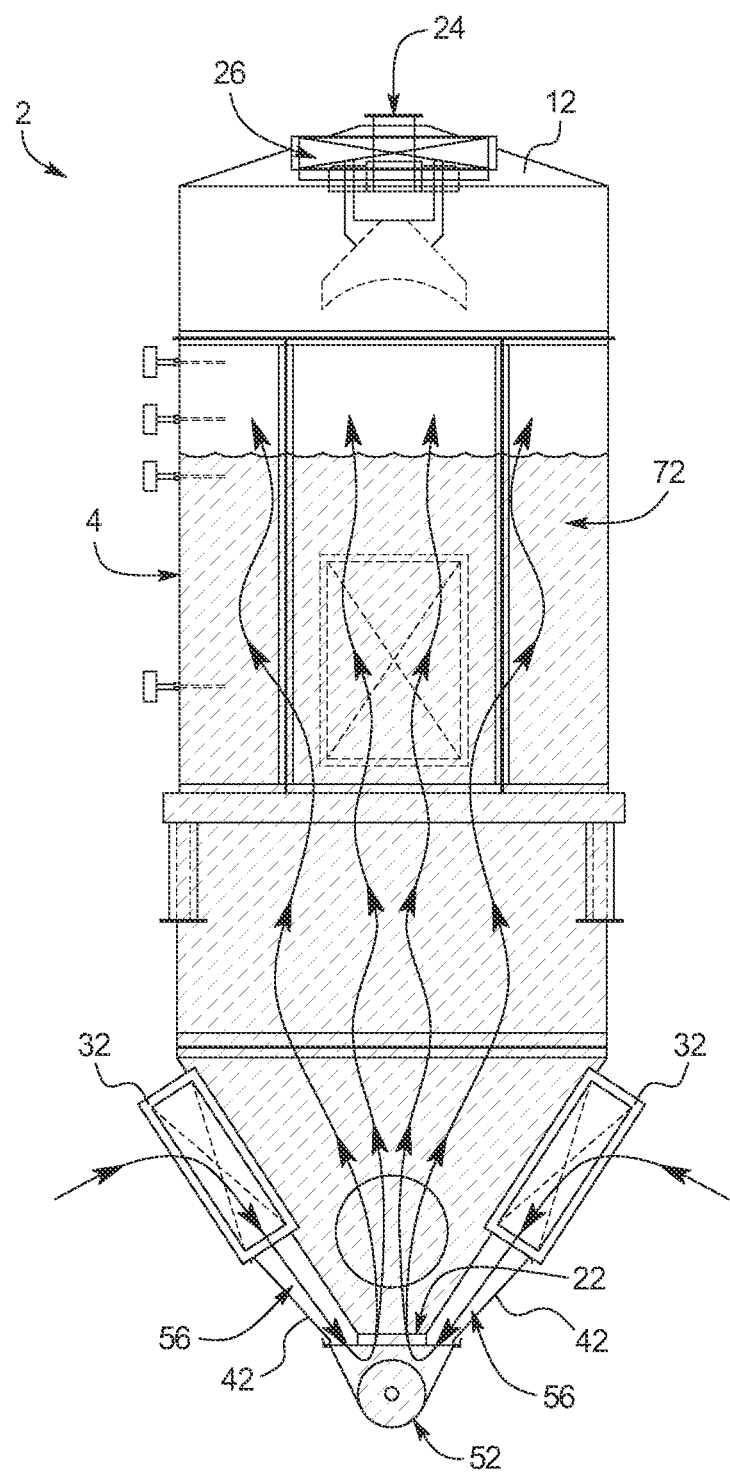
FIG. 3 is a side view of the cooler illustrating the direction of the airflow in an alternative embodiment of the present invention.

As illustrated in FIG. 3, air flows in a direction from the exit opening 34 of the air duct 32 through the product outlet 22 to the air outlet 26 of the chamber 4. In this manner, the air cools the pet food product 72 exiting the product outlet 22 and cools the pet food product 72 remaining in the chamber 4. As a result, the pet food product 72 is constantly exposed to the cooling air from the moment it enters the chamber 4 all the way to entering the conveyor 52 through the product outlet 22. Moreover, the cooling air can contact all of the material in the cooling chamber. This design provides a greater cooling efficiency and cools pet food at a rate significantly greater than current cooler technologies. The design of the cooler 2 further minimizes, for example, elements that can be clogged by particulates or tines of the pet food product and areas of dead space where pet food products accumulate and are difficult to remove, which can result in spoiling and contamination issues.

By way of example and not limitation, the following examples are illustrative of various embodiments of the present invention. Examples of typical airflow and temperatures for the cooler 2 are as follows:

Airflow: 10,000-18,000 CFM
Air temperature in: 10-105° F.
Air temperature out: 50-110° F.
Temperature of the product in: 105-120° F.
Temperature of the product out: 50-100° F.

The typical minimum cooling retention time for the cooler 2 is 12-15 minutes. The typical density of the pet food product that is cooled is 22-28 lbs/ft$^3$. The volume of the pet food that can be cooled using the cooler 2 of the present invention ranges from 73 pounds/minute to about 1000 pounds/minute, which can yield up to 60,000 pounds/hour.

The final cooling rates will depend on variables such as, for example, pet food product size and density, initial temperature of the product, temperature and moisture levels of the cooling air, air flow rate, product feed rate and conveyor speeds. It should be appreciated that the dimensions of the chamber such as height, width and length and volume capacity of the chamber 4 can vary depending on the space available. Nevertheless, the chamber 4 can have any suitable height, width, length and volume capacity in conjunction with the features previously discussed.

In an embodiment, the present invention provides a method for manufacturing a pet food product 72. The method comprises the step of transferring the pet food product 72 to a cooling chamber 4 having a product inlet 24, a product outlet 22, an air outlet 26 and a conveyor 52 positioned below the product outlet 22. The pet food product 72 is deposited in the chamber through the product inlet 24 and accumulates in the chamber 4 and on the conveyor 52 through the product outlet. Airflow is provided to the product outlet 22 of the cooling chamber while the pet food product 72 is settling on the conveyor 52. The airflow travels through the pet food product 72 exiting the product outlet 22 and through the pet food product 72 accumulated in the chamber, for example, as illustrated in FIG. 3. The pet food product 72 that has settled on the conveyor 52 is removed after the product 72 has been sufficiently cooled.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for manufacturing a pet food product, the method comprising:
   transferring the pet food product to a cooling chamber having a product inlet, a product outlet, wherein the product outlet is in the shape of a rectangle having a length and a width, the length being greater than the width, an air outlet and a conveyor positioned below the product outlet, wherein the pet food product is deposited in the cooling chamber through the product inlet and accumulates in the cooling chamber and on the conveyor through the product outlet;
   providing airflow to the product outlet of the cooling chamber while the pet food product is settling on the conveyor, wherein the airflow travels through the pet food product exiting the product outlet and through the pet food product accumulated in the chamber; and
   removing the pet food product that has settled on the conveyor after the pet food product has been sufficiently cooled.

2. The method of claim 1, wherein the cooling chamber further comprises an air duct having an exit opening constructed and arranged for providing the airflow into the product outlet.

3. The method of claim 2, wherein air from the air duct provides the only airflow into the product outlet.

4. The method of claim 2, wherein the cooling chamber further comprises at least one panel addition attached to the air duct for directing the airflow from the exit opening of the air duct to the product outlet of the cooling chamber.

5. The method of claim 2, wherein the cooling chamber further comprises at least one panel addition, wherein the panel addition is attached to the air duct and the conveyor, and wherein the panel addition and the conveyor form an air plenum for directing the airflow from the air duct to the product outlet of the cooling chamber.

6. The method of claim 5, wherein the air plenum is isolated from the external atmosphere.

7. The method of claim 2, wherein the air duct is attached to the cooling chamber.

8. The method of claim 2, wherein air flows in a direction from the exit opening of the air duct through the product outlet to the air outlet of the cooling chamber.

9. The method of claim 1, wherein the conveyer is a type selected from the group consisting of screw, drag, electromechanical vibrating and combinations thereof.

10. The method of claim 1, wherein the cooling chamber comprises:
    a plurality of walls, wherein lower portions of the walls of the cooling chamber form the product outlet; and
    an air duct having an exit opening constructed and arranged for providing the airflow into the product outlet.

11. The method of claim 10, wherein the air duct and the conveyor form an air plenum for directing the airflow from the air duct to the product outlet of the cooling chamber.

12. The method of claim 10, wherein the air duct is constructed and arranged for providing the airflow along the entire length and width of the product outlet into the product outlet.

13. The method of claim 10, wherein at least one of the lower portions of the walls angles inwardly to the product outlet.

14. The method of claim 1, wherein the cooling chamber comprises an air duct having an exit opening constructed and arranged for providing the airflow into the product outlet, wherein the air duct and the conveyor form an air plenum for directing the airflow from the air duct to the product outlet of the cooling chamber.

15. The method of claim 14, wherein the air plenum is isolated from the external atmosphere.

16. The method of claim 1, wherein the cooling chamber comprises a plurality of walls, wherein lower portions of the walls of the cooling chamber form the product outlet, wherein two opposing lower portions of the walls of the cooling chamber taper inwardly to the product outlet, wherein the cooling chamber further comprises an air duct having an exit opening constructed and arranged for providing the airflow into the product outlet; and the cooling chamber further comprises at least one panel addition attached to the air duct for directing the airflow from the exit opening of the air duct to the product outlet of the chamber, wherein air from the air duct provides the only airflow into the product outlet.

17. The method of claim 16, wherein the panel addition and the conveyor form an air plenum for directing airflow from the air duct to the product outlet of the cooling chamber.

\* \* \* \* \*